United States Patent [19]
Zapka et al.

[11] Patent Number: 5,207,875
[45] Date of Patent: May 4, 1993

[54] SEAWATER PRE-DEAERATOR PROCESS FOR OPEN-CYCLE OCEAN THERMAL ENERGY CONVERSION APPLICATIONS

[75] Inventors: Manfred J. Zapka; Hans-Jurgen Krock, both of Honolulu, Hi.

[73] Assignee: University of Hawaii, Honolulu, Hi.

[21] Appl. No.: 803,069

[22] Filed: Jan. 9, 1992

Related U.S. Application Data

[62] Division of Ser. No. 350,912, May 12, 1989, Pat. No. 5,096,544.

[51] Int. Cl.$^5$ .......................... B01D 3/06; B01D 19/00
[52] U.S. Cl. ........................................ 203/11; 203/39; 203/49; 203/88; 55/53; 55/55; 202/176; 202/185.2
[58] Field of Search ............... 55/189, 196, 192, 194, 55/53, 55; 202/176, 205, 185.2; 203/11, 49, DIG. 17, 39, 88

[56] References Cited

U.S. PATENT DOCUMENTS

| | | | |
|---|---|---|---|
| 1,554,138 | 9/1925 | Sobennikoff | 55/192 |
| 3,116,999 | 1/1964 | Armbruster | 55/189 |
| 3,132,013 | 5/1964 | Kumamoto et al. | 55/53 |
| 3,418,214 | 12/1968 | Cane | 202/176 |
| 4,023,941 | 5/1977 | Miller | 55/169 |
| 4,259,360 | 3/1981 | Venetucci et al. | 426/231 |
| 4,391,704 | 7/1983 | Anderson | 55/196 |
| 4,398,925 | 8/1983 | Trinh et al. | 55/15 |
| 4,415,341 | 11/1983 | Echtler | 55/53 |
| 4,420,373 | 12/1983 | Egosi | 202/176 |
| 4,534,774 | 8/1985 | Lecoffre et al. | 55/44 |
| 4,612,021 | 9/1986 | Bland et al. | 55/53 |
| 4,624,686 | 11/1986 | Andrieux et al. | 55/53 |
| 4,681,601 | 7/1987 | Foster | 55/18 |
| 4,752,306 | 6/1988 | Henriksen | 55/53 |
| 5,096,544 | 3/1992 | Zapka et al. | 202/176 |

FOREIGN PATENT DOCUMENTS

| | | | |
|---|---|---|---|
| 59-202040 | 11/1984 | Japan | 55/199 |
| 1255579 | 9/1986 | U.S.S.R. | 55/194 |
| 1461591 | 1/1977 | United Kingdom | . |
| 1531537 | 11/1978 | United Kingdom | . |
| 8300005 | 7/1982 | United Kingdom | . |

Primary Examiner—Wilbur Bascomb, Jr.
Attorney, Agent, or Firm—James Creighton Wray

[57] ABSTRACT

A seawater deaerator has a large reservoir through which seawater slowly flows. Gas is injected into the bottom of the reservoir through porous aeration stones forming bubble nuclei. The seed bubbles move upward through the seawater in the reservoir expanding but not coalescing, and withdrawing dissolved gas from the seawater. The deaerated seawater flows out of the reservoir and subsequently flows through spouts into a flash evaporator. Gas is withdrawn from a low pressure gas chamber at the top of the reservoir by a vacuum pump. The exhaust of the vacuum pump supplies gas to the air injectors.

9 Claims, 1 Drawing Sheet

SEAWATER PRE-DEAERATOR PROCESS FOR OPEN-CYCLE OCEAN THERMAL ENERGY CONVERSION APPLICATIONS

This application is a division of application Ser. No. 350,912, filed May 12, 1989, now U.S. Pat. No. 5,096,544.

BACKGROUND OF THE INVENTION

In about 1859 William Rankine described a Rankine cycle in which water is vaporized to steam, work is produced by the steam and the steam is condensed. In about 1909 Georges Claude described the use of a Rankine cycle to produce work with the temperatures and pressures available in tropical seawater. One of the problems in producing work from tropical seawater is that dissolved gases are included in the water. Expanding and compressing the gases requires and wastes energy. Moreover the gases interfere with the heat flow characteristics, especially in the condenser. The present invention is directed to solving problems associated with the dissolved gases in seawater. The invention has special application to the removal of gases from water in open-cycle ocean thermal energy conversion (OC-OTEC) plants. The invention has application in situations in which it is desirable to deaerate or to remove gases from seawater. The invention also has application in the separation of gases from liquids.

Seawater contains dissolved gases, primarily nitrogen and oxygen. Dissolved gas concentrations in the cold water layer of the ocean near the Hawaiian islands indicate that oxygen is significantly below saturation and nitrogen is at or slightly below saturation with respect to air at atmospheric pressure. Carbon dioxide is significantly supersaturated in this cold water layer. The warm surface water is generally slightly supersaturated with both nitrogen and oxygen while carbon dioxide is below saturation.

In an open-cycle ocean thermal energy conversion plant, dissolved gases will be released in the evaporator and direct contact condenser (if used). By accumulating near the condensing surface, the inert gases lower the partial pressure of the steam, hence lowering the saturation temperature of the steam. Reduction of the temperature differential between the saturation temperature and the temperature of the condensing agent lowers the amount of heat flow in the condenser. Simultaneously, these gases raise the condenser pressure. In order to maintain the low pressure required present open-cycle thermal energy conversion design configurations remove these gases continuously by means of a vacuum pump attached to the condenser, i.e., at the lowest pressure in the system.

The usual plan for the removal of the non-condensible gases is to compress them to atmospheric pressures and release them to the atmosphere. This imposes a significant burden on the overall system efficiency with parasitic losses in the range of 10 to 15% of the gross power depending on the fraction of non-condensibles which evolve.

The other method for handling the non-condensibles is pre-deaeration. Pre-deaeration occurs upstream of the evaporator or the direct contact condenser (if used). It requires additional system components. The advantage of this deaeration strategy is that the evolved gases are removed at a higher pressure than the boiling point. In addition, accumulation of non-condensibles near the condensing surfaces does not occur and the related inefficiency can be avoided.

As noted, post-deaeration method gases are removed from the condenser at the lowest pressure in the system. Removal at this point requires greater compression power than for pre-deaeration. In post-deaeration, however, no additional components are required and additional hydraulic head losses, which are associated with pre-deaeration devices, are avoided.

The deaeration technique presented herein is a pre-deaeration process.

SUMMARY OF THE INVENTION

A seawater deaerator has a large reservoir through which seawater slowly flows. Gas is injected into the bottom of the reservoir through porous aeration stones forming a bubble nuclei. The seed bubbles move upward through the seawater in the reservoir expanding but not coalescing and withdrawing dissolved gas from the seawater. The deaerated seawater flows out of the reservoir and subsequently flows through spouts into a flash evaporator. Gas is withdrawn from a vacuum chamber at the top of the reservoir by a vacuum pump. The exhaust of the vacuum pump supplies gas to the air injectors.

The invention especially works in seawater because of the function of coalescence. Because of the particular relations of electric charges, surface tension and viscosities, small bubbles tend not to coalesce and not to agglomerate into larger bubbles. The existence of smaller bubbles in seawater means larger surface areas with the same volume of gas. Consequently, the smaller bubbles are effective in removing dissolved gas from the water.

The invention has several applications, for example, in aquaculture. The invention may be useful in situations where it is desirable to remove gas before propelling fluid to avoid cavitation. When used in seawater pre-deaerator for open cycle ocean thermal energy conversion plants, the present invention provides a 20-fold energy savings over other known devices.

Deaeration effectiveness is strongly dependent on the pressure in the deaerator vessel. With low pressures, the saturation concentration of dissolved gases is low, which gives rise to a high driving force for gas transfer.

Deaeration rates are low if no bubble seeding occurs in the intake water. With moderate air injection the degree of deaeration increases with the volume of injected air, provided that optimum air injection conditions prevail.

Deaeration rates in the barometric upcomer alone are insufficient for optimum open-cycle ocean thermal energy conversion applications. A water reservoir has to be incorporated in the deaeration system to allow for a longer residence time of water at low pressure.

Injection of air should occur in the low pressure water reservoir and not in the barometric riser. Air injection into the barometric leg is likely to stimulate undue bubble coalescence.

Air injection should be such as to produce small bubbles. Air injection done in a wide spread pattern of appropriate air stone injectors would avoid appreciable concentration of injected air and the resulting formation of larger size air slugs.

A preferable source for bubble nuclei injection is the exhaust of the vacuum pumps. This procedure would have the advantage of circulating the air in a low pressure environment and would thereby significantly reduce the power requirements for the vacuum compressor system.

The choice of the optimum depth of the water reservoir depends on two conflicting criteria: a) The water column has to be deep enough to provide sufficient residence time for bubble rise. b) The water column should not be too deep, since the pressure exerted on bubbles increases, thereby decreasing the deaeration performance of system and requiring higher pressure at the injector.

The water reservoir is the main component of the recommended deaeration process and serves the following functions: a) It allows a longer residence time for the intake water in a lower pressure environment. b) It allows air injection to take place at low pressure. c) It provides a water body where injected bubbles remain suspended for an adequate time for deaeration to occur. d) It provides a water body where bubbles can rise to the surface and be separated before the water enters the evaporator or the condenser (if direct contact condensation is used).

The evolution of non-condensible gases in the OC-OTEC evaporator and condenser may result in a deterioration of the overall performance.

Preliminary tests indicated that gas transfer is more efficient in natural seawater than in fresh water. Subsequent studies have been carried out to identify the probable reasons and mechanisms for the accelerated gas transfer processes in seawater. In addition, some basic engineering requirements for pre-deaeration as well as reinjection into the downcomer were investigated. Experiments have been performed to quantify the mechanisms regulating gas transfer in bubbles and in a packed column.

The results of these experiments suggest fundamental differences in the magnitudes of the overall gas transfer process in seawater and fresh water. Bubble coalescence is significantly less in seawater than in fresh water, resulting in greater liquid-gas interfacial area and consequently higher transfer rates in seawater. However, single bubble experiments showed that the magnitude of overall transfer is similar in seawater and in fresh water. The liquid transfer coefficient, which expresses gas transfer rates per unit surface area, for seawater is slightly smaller than or equal to that of fresh water. Gas transfer rates for dissolved nitrogen were observed to be similar to those for dissolved oxygen.

Gas liberation in OC-OTEC subsystems is primarily dependent on the system vacuum, the residence time of the water at low pressure and the type and magnitude of bubble seeding. Even with bubble seeding the total amount of deaeration in the barometric upcomer alone is relatively low. Consequently, a reservoir is incorporated in the feed water system to increase the residence time at low pressure of the water to be deaerated. An OC-OTEC deaeration device was designed from the experimental results. Design particulars of the device include a low pressure reservoir, a seed bubble injection device in the reservoir and gas-liquid separation just upstream of the evaporator and/or direct contact condenser. The seed bubble stream is provided from the vacuum pump discharge. Provided appropriate system conditions are met, approximately 85% of dissolved gases may be removed from the OC-OTEC feed stream. A schematic of the pre-deaeration system for the warm water stream is given in the accompanying figures. A post-reaeration scheme was developed which uses part of the vacuum pump exhaust to partially reaerate the OC-OTEC discharge stream. The use of such a hydraulic compressor is more efficient than mechanically compressing these gases for discharge to the atmosphere. Such a system also eliminates the discharge of excessive amount of carbon dioxide to the atmosphere as well as increasing the oxygen content of the discharge water. Preliminary experiments show that reaeration is more efficient in seawater than in fresh water.

Adaptation of these procedures in the design of OC-OTEC systems results in increased efficiency, decreased cost and the elimination of some potentially damaging environmental impacts.

An object of the invention is the provision of a seawater deaerator having a water reservoir, a vacuum chamber above the water reservoir. Conduction means moves gas to the vacuum chamber from the water reservoir to conduct gas into the vacuum chamber. A vacuum pump connected to the vacuum chamber evacuates the vacuum chamber. Gas injectors near a bottom of the water reservoir inject gas in the water reservoir. A conduit connected to an exhaust of the vacuum pump supplies exhaust gas from the vacuum pump to the gas injectors. The air injectors release gas into the reservoir in fine seed bubble nuclei.

Exhaust spouts supply water from the reservoir to a flash evaporator. A water intake supplies water to the reservoir. Water is directed from the intake through the reservoir away from the exhaust spouts.

The preferred exhaust pump reduces pressure in the vacuum chamber to about 27 inches of mercury. Preferably, the air injectors are positioned about one and a half meters below a surface of seawater in the reservoir.

The preferred reservoir is generally circular in conform and surrounds an axial water intake and an array of spouts leading to a flash evaporator. The baffle positioned between the water intake and the array of spouts for directing water from the intake to the reservoir and from the reservoir to the spouts.

A preferred seawater pre-deaerator for open-cycle ocean thermal energy conversion plants includes a vertical riser water intake, a baffle at the top of the intake directing water from the intake generally radially outward, and a circular water reservoir at the top of the water intake surrounding the baffle. Water flows from the water intake outward as directed by the baffle into the water reservoir. An array of spouts above the baffle and within the reservoir for releasing water flowing from the reservoir into the spouts. Plural air injectors positioned in the reservoir release air into the reservoir and bubble air upward through the reservoir, removing dissolved gases from seawater in the reservoir.

Preferably, the water intake, reservoir, baffle, spout array and evaporator are axially aligned on a vertical axis and the preferred air injectors are porous aeration stones arranged in concentric circular patterns in the reservoir.

This invention provides the method of deaerating seawater which includes supplying seawater to a reservoir, releasing fine seed bubble nuclei gas into the water in the reservoir, bubbling the gas through the reservoir, withdrawing dissolved gas from the seawater in the reservoir with the bubbles, removing gas from the top of the reservoir and flowing deaerated seawater from the reservoir.

The preferred method further includes evaporating the deaerated seawater to form steam, expanding the steam, and condensing the steam by direct contact with additional cold seawater.

The preferred removing step comprises removing the withdrawn gas and the released gas by pumping the gas away from a top of the reservoir.

The preferred releasing of seed bubbles comprises conducting pumped gas to a bottom of the reservoir and injecting the pumped gas into the bottom of the reservoir.

Preferably, the injecting gas provides creating bubble nuclei in the bottom of the reservoir through an array of porous aeration stones.

In the preferred method the supplying includes directing water around a baffle outwardly into a reservoir. The flowing includes flowing water inwardly from the reservoir toward evaporation spouts, and the removing includes removing gases from a vacuum chamber above the reservoir.

These and other and further objects and features of the invention are apparent in the disclosure which includes the above and ongoing specification and claims and the drawings.

DETAILED DESCRIPTION OF THE DRAWINGS

Figure 1:
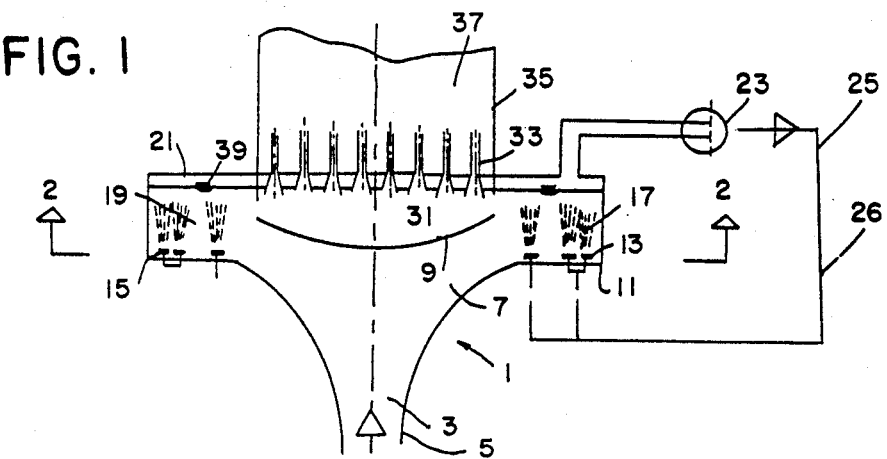
FIG. 1 is a schematic representation of a preferred degassification system of the present invention.
Figure 2:
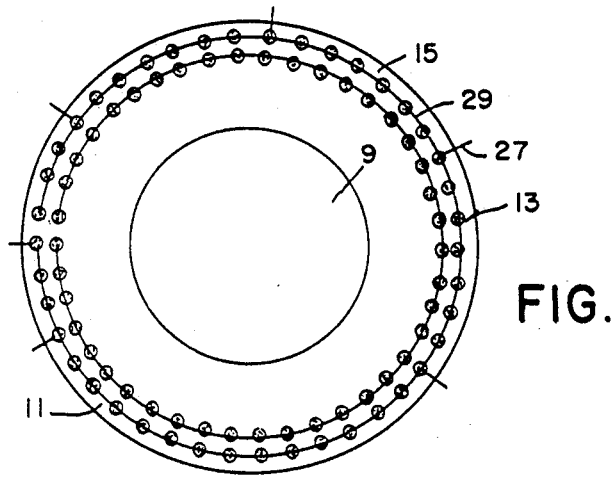
FIG. 2 is a cross-sectional plan view of the system shown in FIG. 1.

Referring to FIG. 1, a degassification system of the present invention is generally indicated by the numeral 1. Seawater 3 flows upward through a barometric riser water intake 5 and outward 7 past a baffle 9 into a large cylindrical reservoir 11. Within the base of reservoir 11 is an array 13 of individual porous aeration stones 15.

Air injection should be such that small bubbles can be produced. Air injection done through the porous aeration stones 15, ensures that the air is released in the form of fine seed bubbles. This avoids appreciable concentration of injected air and the resultant formation of larger sized air slugs. The streams of these upward flowing small bubbles are generally indicated by the lines 17. As the bubbles flow upward they expand and form increasing volumes having pressure slightly higher than the pressure of the surrounding seawater. Dissolved gases from the seawater are withdrawn into the expanding and upward moving bubbles 17, degassifying the seawater 19 within the reservoir. As they reach the surface of the seawater in the reservoir the bubbles break up and their gas flows through outlet 39 and collects in a vacuum chamber 21 which is evacuated with a vacuum pump 23. An exhaust 25 of the vacuum pump supplies plural air lines 27 through reinjection head 26, leading to the distribution lines 29 for gas injectors 15. Deaerated seawater flows under cylindrical baffle 41 and into the volume 31 above central core baffle 9 and flows outward through vaporizing spouts 33 into flash evaporator or direct current condenser (if used) 35. The surface of the evaporator may be warmed by sun or seawater or both. Finally, the steam 37 formed within the evaporator is flowed to a work producer, such as a steam engine or turbine. A pressure drop across the work producing device is established by connecting to its exhaust a condenser which may be a direct contact seawater condenser. The preferred process is referred to as an open-cycle process because new water is continually used and the used water is returned to the ocean.

Figure 3:
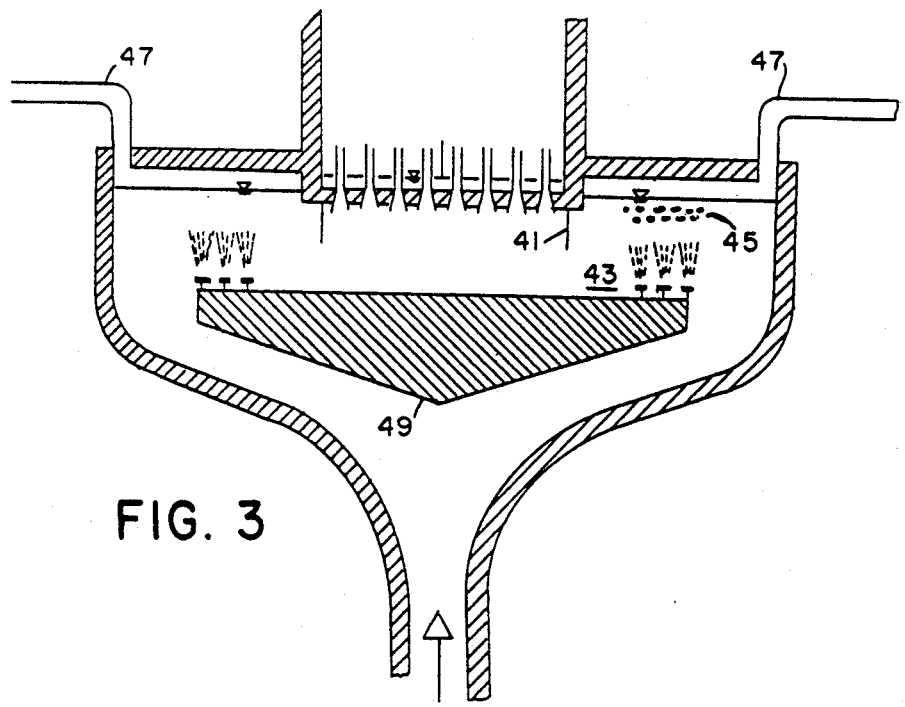
FIG. 3 is a schematic detail of a preferred seawater degassification system of the present invention.

As shown in FIG. 3, baffle 9 is replaced by a conical wall 49. A cylindrical baffle 41 at the outlet of reservoir 11 helps to separate the deaerated water flowing through space 43 under the baffle 41 from the rising bubbles 45.

One or more vacuum conduits 47 lead to one or more vacuum pumps. Part of the exhaust from the vacuum pumps is reintroduced to the reservoir through injectors 15. The rest of the removed gas is returned to the deaerated water after it has cycled through the work producing system and as it is discharged back into the ocean.

In one example of operation, the reduced pressure chamber 21 is maintained at a vacuum of about 27 inches of mercury. The air injectors are about one and a half meters below the surface of the water in the reservoir which is sufficient to expand the bubble nuclei or seed bubbles as they rise through the water and to withdraw sufficient gas while keeping power requirements low. The entire vacuum and air injection system operates at below atmospheric pressures in a preferred embodiment. There is no separation between water surface in reservoir 11 and overlaying low pressure air space which is a low pressure gas chamber 21.

While the invention has been described with reference to specific embodiments, modifications and variations of the invention may be constructed without departing from the scope of the invention which is defined in the following claims.

I claim:

1. A method of deaerating seawater comprising the steps of supplying seawater to a reservoir, releasing seed bubbles of gas into the seawater supplied to the reservoir by means of gas injectors located at a bottom of the reservoir, bubbling the gas through the reservoir, withdrawing dissolved gas from the seawater in the reservoir with the bubbles to a top of the reservoir, removing the withdrawn gas from the reservoir by means of a vacuum pump, recycling the removed gas by supplying the gas from the vacuum pump to the gas injectors, and flowing out deaerated seawater from the reservoir.

2. The method of claim 1 further comprising the step of evaporating the deaerated seawater and condensing the evaporated seawater by direct contact with additional cold seawater by a surface condenser.

3. The method of claim 1 wherein the removing step comprises removing the withdrawn gas and the released gas by pumping the gas away from a top of the reservoir.

4. The method of claim 3 wherein the step of releasing seed bubbles comprises conducting pumped gas to a bottom of the reservoir and injecting the pumped gas into the bottom of the reservoir through the gas injectors.

5. The method of claim 4 wherein the step of injecting gas comprises creating bubble nuclei in the bottom of the reservoir through a porous array of plural stones.

6. The method of claim 5 wherein the step of supplying further comprises directing water around a baffle outwardly into the reservoir and wherein the step of flowing further comprises flowing water inwardly toward evaporation spouts and wherein the step of removing comprises removing gases from a low pressure gas chamber above the reservoir.

7. The method of claim 1 wherein the step of supplying comprises directing incoming seawater to the reservoir and wherein the step of flowing comprises redirecting seawater from the reservoir to prevent direct flowing of the seawater into and out of the reservoir.

8. The method of claim 7 wherein the step of redirecting comprises flowing seawater out of the reservoir beneath a baffle.

9. The method of claim 6 wherein the step of removing further comprises withdrawing gas away from the top of the reservoir and reaerating deaerated seawater with the withdrawn gas by exhausting the withdrawn gas into the deaerated seawater.

* * * * *